United States Patent

Gregory

[15] 3,702,536

[45] Nov. 14, 1972

[54] ROCKET THRUST THROTTLING SYSTEM

[72] Inventor: John W. Gregory, Middleburg Heights, Ohio

[73] Assignee: The United States of America as represented by the Administrator of the National Aeronautics and Space Administration

[22] Filed: Jan. 18, 1971

[21] Appl. No.: 107,380

[52] U.S. Cl. ...................60/211, 60/240, 60/243, 137/81.5
[51] Int. Cl. ..............................................C06d 5/00
[58] Field of Search........60/205, 211, 213, 240, 243, 60/258, 39.74 A; 137/13, 81.5

[56] References Cited

UNITED STATES PATENTS 3,507,116  4/1970  Berry......................60/258 X
3,426,534  2/1969  Murphy......................60/258
3,417,772  12/1968  Schaeffer.................60/258 X
3,474,670  10/1969  Rupert..................137/81.5 X
3,468,487  9/1969  Warren....................60/258 X Primary Examiner—William F. O'Dea
Assistant Examiner—P. D. Ferguson
Attorney—N. T. Musial, G. E. Shook and John R. Manning

[57] ABSTRACT

A small vortex fluid amplifier is located at the entrance to the oxidizer tube of a coaxial injector. The vortex fluid amplifier differentially controls the oxidizer flow by means of a variable vortex flow field to throttle the thrust of a rocket engine.

9 Claims, 3 Drawing Figures

INVENTORS
JOHN W. GREGORY

ROCKET THRUST THROTTLING SYSTEM

STATEMENT OF GOVERNMENT OWNERSHIP

The invention described herein was made by an employee of the United States Government and may be manufactured and used by or for the Government for governmental purposes without the payment of any royalties thereon or therefor.

BACKGROUND OF THE INVENTION

This invention is concerned with throttling the thrust of a liquid bipropellant rocket engine. The invention is particularly directed to rocket engine throttling with no reduction in specific impulse over the full throttling range using a minimum number of control devices.

Rocket engine thrust has been throttled by several conventional methods. Control valves may be placed in both propellant flow lines to throttle flow rates. Another method is to reduce turbine power with a resultant reduction in propellant pump outputs. With this method the turbine working fluid flow rate is usually reduced.

Throttling also may be achieved by constricting the propellant flow areas at the injector. This method utilizes a movable pintle or sleeve to reduce the propellant orifice area in the injector.

Certain problems are encountered with each throttling method. Among these is a reduction in specific impulse with a reduction in thrust. This performance decrease is caused by the inability to maintain the variables affecting propellant atomization and vaporization in the correct proportion as flow is reduced. These variables include the oxidizer-to-fuel velocity ratio.

The use of movable pintles or sleeves to change the propellant orifice areas at the injector face poses difficult problems of design and manufacture. Such devices are exposed to the propellants and hot combustion chamber gases thereby introducing additional problems caused by high temperatures and corrosive environments. Problems are also encountered in sealing between the moving and fixed parts of such devices.

SUMMARY OF THE INVENTION

These problems have been solved by an injector constructed in accordance with the present invention which utilizes a number of coaxial elements in which liquid oxidizer is injected through a central tube and fuel is injected in an annular sheath around the oxidizer. The liquid oxidizer flow passes through a vortex fluid amplifier in each element to differentially control the oxidizer flow by a variable vortex flow field.

OBJECTS OF THE INVENTION

It is, therefore, an object of the present invention to provide an improved method and apparatus for throttling the thrust of a liquid rocket engine.

Another object of the invention is to provide throttling of propellant flow without using moving parts.

A further object of the invention is to provide a high pressure drop across the injector of a liquid rocket engine at low flows to improve stability and provide high performance at throttled conditions.

These and other objects of the invention will be apparent from the specification which follows and from the drawings wherein like numerals are used throughout to identify like parts.

IN THE DRAWING

DESCRIPTION OF THE PREFERRED EMBODIMENT

Figure 1:
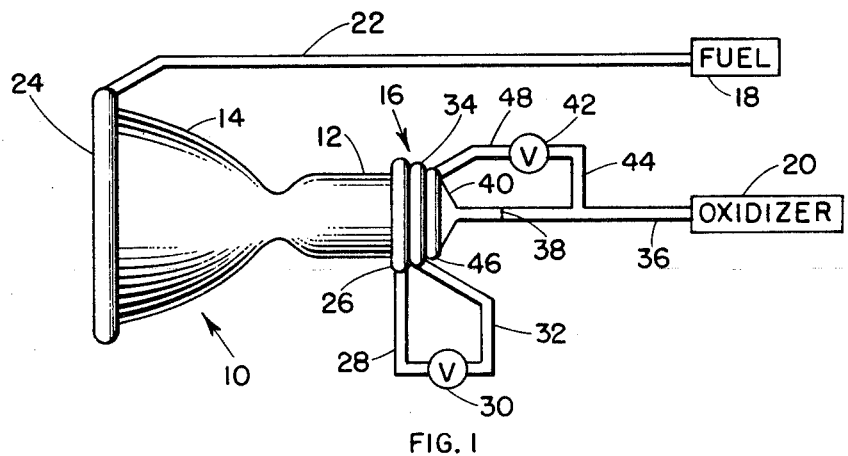
FIG. 1 is a schematic diagram showing an engine throttling control system constructed in accordance with the present invention.

Referring now to the drawing there is shown in FIG. 1 a liquid bipropellant rocket engine 10 having a combustion chamber 12 and a convergent-divergent nozzle 14. An injector 16 embodying the features of the invention is located at one end of the combustion chamber 12 opposite the nozzle 14.

Propellants are supplied to the rocket engine 10 from a fuel supply tank 18 and an oxidizer supply tank 20. The injector of the present invention is preferably used with propellant combinations wherein the oxidizer is a liquid and the fuel is a gas at the injector. Hydrogen-oxygen, hydrogen-fluorine, and FLOX-methane are examples of such combinations.

Both the combustion chamber 12 and the nozzle 14 are regeneratively cooled in a manner well known in the art. Liquid fuel is directed through a supply line 22 to a downstream header 24 at the discharge end of the nozzle 14. This liquid fuel then moves to an upstream header 26 through suitable tubes or passages encircling the combustion chamber 12 and the nozzle 14. This serves to cool the rocket engine 10 while heating the fuel.

The fuel is discharged from the header 26 through a line 28 connected to a fuel throttle valve 30. A line 32 connects the fuel throttle valve 30 to a fuel manifold 34 shown in both FIGS. 1 and 2.

Oxidizer is supplied to the rocket engine 10 through a supply line 36 from the tank 20. As best shown in FIG. 1 the oxidizer flow in the supply line 36 is divided into two parts. The flow proportions are dependent upon the throttling ratio desired and the amount of residual control flow used for biasing to impart an initial swirling to the vortex field.

Figure 2:
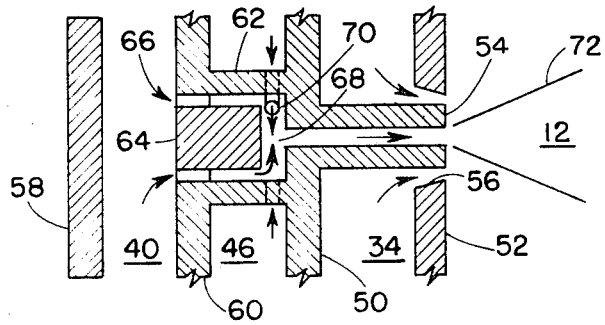
FIG. 2 is a section view of a coaxial injector element having a vortex chamber constructed in accordance with the present invention.

The primary oxidizer flow is directed through an orifice 38 and thence to the injector 16 where it enters a primary supply manifold 40 shown in FIG. 2. The orifices 38 reduces the oxidizer pressure prior to entry into the manifold 40.

The remaining portion of the oxidizer from the tank 20 is directed to an oxidizer control flow valve 52 through a control line 44 which is connected to the oxidizer supply line 36 between the tank 20 and the orifice 38. This control portion of the oxidizer flow is then directed from the valve 42 to a control manifold 46 through a line 48.

Referring now to FIG. 2 there is shown a coaxial throttling injector element constructed in accordance with the present invention. The injector 16 comprises a number of these elements. The fuel manifold 34 is formed by the space between a plate 50 and an end wall 52 of the combustion chamber 12. A tube 54 extends outward from the plate 50 into an opening 56 in the end wall 52. The oxidizer primary supply manifold 40 is formed by the space between a housing 58 and a plate 60. The oxidizer control supply manifold 46 is formed by the space between the plates 50 and 60.

An annular wall 62 extends between the plates 50 and 60 at each injector element. One end of the volume enclosed by the wall 62 is open to the oxidizer primary flow manifold 40 while the opposite end is open to the oxidizer tube 54. A cylindrical button 64 is mounted within the space defined by inner surface of the annular wall 62. An annular flow passage 66 is formed by the space between the outer surface of the button 64 and the inner surface of the annular wall 62.

The vortex chamber 68 is formed by the space between the button 64 and the surface of the wall 50 adjacent the oxidizer tube 54. The annular oxidizer flow passage 66 places the primary oxidizer flow manifold 40 in communication with the vortex chamber 68. The primary oxidizer flow passes around the circular button 64 in each element through the passage 66 and enters the vortex chamber 68 as an annular sheet along the peripheral surface of the chamber.

A plurality of passages 70 extend through the annular wall 62 to place the control flow manifold 46 in communication with the vortex chamber 68. The passages 70 are tangential to the peripheral wall of the vortex chamber 68. The oxidizer control flow enters the vortex chamber tangentially to impart a swirling motion to the flow. This swirling oxidizer then flows through the tube 54 into the combustion chamber 12. The oxidizer flow leaves the tip of the injection tube 54 in the form of a hollow cone spray 72. Fuel is injected as an annular sheath around the hollow cone spray 72 as it passes from the fuel manifold 34 through the opening 56.

Figure 3:
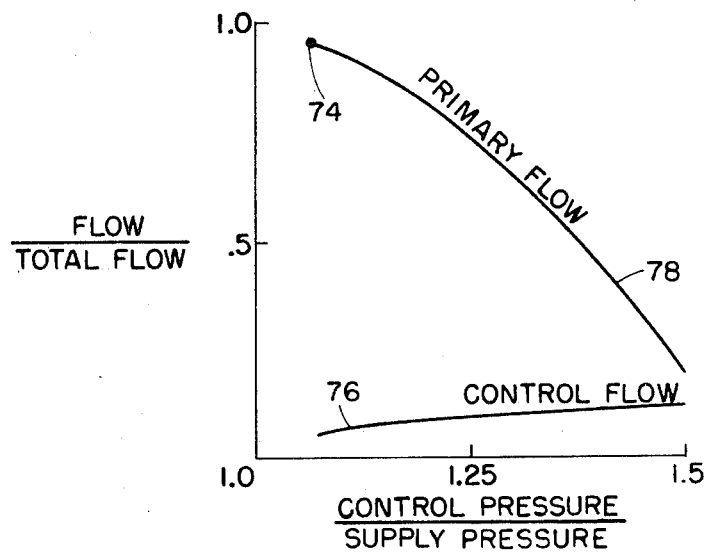
FIG. 3 is a graph showing the operating characteristics of a vortex fluid amplifier.

The operating characteristics of the vortex flow amplifier are shown in FIG. 3. Each element operates as a throttle valve because of the impedance to flow offered by the vortex flow field. The initial operating point of the device at full thrust would be at 74, a bias point which is preferably 90 percent of the flow passing through the primary flow manifold 40 and 10 percent through the control flow manifold 46.

As control flow is increased along the line 76 by operating the control flow valve 42 the primary flow is reduced along the line 78 and the total oxidizer flow is likewise reduced.

Similar throttling of the fuel flow is accomplished by the control valve 30 which reduces fuel flow in proportion with the oxidizer flow. This assures constant mixture ratio operations as thrust is changed.

Because of the swirling motion imparted to the oxidizer flow in the vortex chamber, the oxidizer flow enters the combustion chamber 12 in the form of a hollow cone spray. It is not necessary to rely on a mechanical swirler in the oxidizer tube to obtain a conical spray. The rotating motion imparted in the flow by the tangential entry passages is retained by the fluid passing through the fairly long cylindrical tube 54. The use of the vortex chamber at the entrance to each oxidizer tube 54 not only imparts a swirling motion to the flow, but causes the conical spray to persist as flow is throttled. This assures intimate mixing of the propellants and good atomization at all throttle settings.

While the preferred embodiment of the invention has been described it will be apparent that various structural modifications may be made without departing from the spirit of the invention and the scope of the subjoined claims. In propellant systems using a liquid fuel and liquid oxidizer a vortex chamber may be used in both the fuel and oxidizer injection tubes so that each propellant can be controlled. Propellant sprays would then be arranged in an impinging pattern such as a doublet or triplet element rather than a coaxial arrangement. In some pump-fed engine systems it is contemplated that a small high pressure pump may be used to provide the control flow which must be about 1.5 times the primary flow pressure. This control flow is then varied by controlling the output of the pump. This eliminates the need for the orifice 38 in the primary flow line 36.

What is claimed is:

1. In a system for injecting propellant into a combustion chamber of a rocket engine, the improvement comprising
   a plurality of injector elements mounted at one end of said combustion chamber, each of said injector elements including a tube for directing a propellant from a manifold to the combustion chamber,
   means for directing a flow of fuel from a fuel supply to said injector elements,
   a vortex fluid amplifier at the entrance to said tube for establishing a variable vortex flow field in at least one of said flows to throttle the thrust of said rocket engine, said vortex fluid amplifier being operable to selectively alter said one of said flows and impart a swirling motion thereto whereby the propellant is discharged into the combustion chamber as a spray, and
   means for injecting the other propellant into said combustion chamber in an annular sheath around the propellant discharging from said tube.

2. In a system for injecting propellant into a combustion chamber of a rocket chamber, the improvement comprising
   a plurality of injector elements mounted at one end of said combustion chamber,
   each of said injector elements including a tube for directing a propellant from a manifold to the combustion chamber,
   means for directing a flow of fuel from a fuel supply to said injector elements,
   means for directing a flow of oxidizer from an oxidizer supply to said manifold whereby said oxidizer flows through said tube into said combustion chamber,
   a vortex fluid amplifier at the entrance to said tube for establishing a variable vortex flow field in the oxidizer flow to throttle the thrust of said rocket engine, said vortex fluid amplifier being operable to selectively alter the oxidizer flow and impart a swirling motion thereto whereby said oxidizer is discharged into the combustion chamber, and
   means for injecting fuel into said combustion chamber in an annular sheath around said oxidizer.

3. Apparatus as claimed in claim 2 wherein the fuel is a gas.

4. Apparatus as claimed in claim 2 wherein the oxidizer is a liquid.

5. Apparatus as claimed in claim 2 including means for dividing the flow of oxidizer from the oxidizer supply into a primary flow and a control flow, and
means for directing each of said flows into the vortex fluid amplifier.

6. In a system for injecting propellant into a combustion chamber of a rocket engine, the improvement comprising
a plurality of injector elements mounted at one end of said combustion chamber, each of said injector elements including a tube for directing a propellant from a manifold to the combustion chamber,
means for directing a flow of liquid oxidizer from an oxidizer supply to said manifold whereby said oxidizer flows through said tube into said combustion chamber,
means for dividing the flow of oxidizer into a primary flow and a control flow,
a vortex fluid amplifier at the entrance to said tube for establishing a variable vortex flow field in the oxidizer flow to throttle the thrust of said rocket engine, said vortex fluid amplifier comprising
a vortex chamber at the entrance of each tube,
an annular flow passage for directing said primary flow of oxidizer into said vortex chamber along the peripheral surface thereof, and
a plurality of passages extending through the wall of each vortex chamber tangentially to the peripheral surface thereof, said passage being in communication with said control flow of oxidizer for injecting the same tangentially to said primary flow of said oxidizer from said annular flow passage to selectively alter the oxidizer flow and impart a swirling motion thereto whereby said oxidizer is discharged into the combustion chamber as a spray having a hollow conical configuration,
means for directing a flow of fuel from fuel supply to said injector elements, and
means for injecting fuel into said combustion chamber in an annular sheath around said oxidizer.

7. A method of throttling the thrust of a liquid bipropellant rocket engine with no reduction in specific impulse over the full throttling range, said method comprising the steps of
dividing the total flow of one propellant to said rocket engine into a primary flow and a control flow,
forming said primary flow into at least one annular sheet directed toward the combustion chamber of said rocket engine,
directing said control flow tangentially to said annular sheet whereby said total flow of one propellant is reduced as the control flow is increased, and
selectively altering said control flow to throttle the flow of said one propellant.

8. A method of throttling the thrust of a rocket engine as claimed in claim 10 including the step of
injecting the other propellant into the combustion chamber in an annular sheath around the one propellant.

9. A method of throttling the thrust of a rocket engine as claimed in claim 10 wherein a swirling motion is imparted to the one propellant by the tangential control flow whereby the one propellant is discharged into the combustion chamber as a spray having a hollow conical configuration, and
continuing the swirling motion as the flow of the one propellant is throttled whereby the hollow conical spray configuration is retained throughout the flow range.

* * * * *